United States Patent [19]
Thybo

[11] Patent Number: 5,909,372
[45] Date of Patent: Jun. 1, 1999

[54] USER INTERFACE FOR PROGRAMMING A MOTOR CONTROLLER

[75] Inventor: Claus Thybo, Sønderborg, Denmark

[73] Assignee: Danfoss A/S, Nordborg, Denmark

[21] Appl. No.: 08/659,917

[22] Filed: Jun. 7, 1996

[51] Int. Cl.$^6$ .................................................. G05B 9/02
[52] U.S. Cl. .......................... 364/188; 364/146; 345/354; 345/967; 345/970
[58] Field of Search .................................... 364/188, 189, 364/167.01, 146; 345/352, 353, 354, 964–970

[56] References Cited

U.S. PATENT DOCUMENTS

| | | | |
|---|---|---|---|
| 4,663,704 | 5/1987 | Jones et al. | 364/188 |
| 4,679,137 | 7/1987 | Lane et al. | 364/188 |
| 4,992,929 | 2/1991 | Yamada et al. | 364/189 |
| 5,168,441 | 12/1992 | Onarheim et al. | 364/146 |
| 5,251,125 | 10/1993 | Karnowski et al. | 364/189 |
| 5,297,252 | 3/1994 | Becker | 364/188 |
| 5,392,207 | 2/1995 | Wilson et al. | 364/167.01 |
| 5,400,246 | 3/1995 | Wilson et al. | 364/146 |
| 5,453,926 | 9/1995 | Stroschin et al. | 364/188 |

*Primary Examiner*—William Grant
*Assistant Examiner*—Sheela S. Rao
*Attorney, Agent, or Firm*—Lee, Mann, Smith, McWilliams, Sweeney & Ohlson

[57] ABSTRACT

There is disclosed a method and system for improving the user interface between operator and motor controller, in particular a frequency converter. According to the invention, instead of presenting all information on a display at one time, a method of programming the motor controller is suggested, in which the operator is guided through the set up procedure, so that only relevant parameters are displayed on the different views. Another aspect of the invention is a method of programming a motor controller not in terms of parameter and parameter numbers, but in physical, technical and process terms. In this way, a high level mode of programming a motor controller is achieved, because the user interface does not deal with the less interesting motor controller specific parameters, but instead allows the operator to program the unit in terms he uses.

3 Claims, 6 Drawing Sheets

USER INTERFACE FOR PROGRAMMING A MOTOR CONTROLLER

This invention relates to the user interface between user and motor controller for operating electrical motors, in particular with an interface consisting of a personal computer equipped with interfacing software. It is the aim of the invention to make initial programming and set up of a frequency converter easier and less time consuming than it has been the case hitherto.

BACKGROUND OF THE INVENTION

Today's motor controllers—e.g. DC drives, servo controllers and frequency converters—are digitally controlled, with a huge number of control possibilities made possible through the digitization. Most electronic control devices are programmed via a menu consisting of a number of parameters to be set. For example, setting a Danfoss (manufactured by Danfoss A/S, Nordborg, Denmark) frequency converter VLT® series 3000 to ramp up the motor in 45 seconds requires programming of parameter number 217 to "45". However, this means some maneuvering on the user panel located on front of the unit. First step is selecting the right group, which can be found by looking in the user manual. After selecting Group 2 "Operations set up", next the correct parameter number for "Ramp up" must be located. Again, the user manual will help. The correct parameter number is 217, which can then be set to "45". During this single programming step the buttons on the user panel have been activated quite a few times, and consulting the user manual was necessary.

For the optimal setting of a frequency converter a minimum of about 10 parameters have to be accessed and set up, which is cumbersome and time consuming from the front panel on the unit. However, linking the motor controller to a personal computer (PC) and programming, monitoring or servicing the motor controller with the software on the PC is another way of accessing the motor controller. U.S. Pat. No. 5,392,207 to Wilson et al. describes a motor controller connected to a PC which incorporates software for servicing the motor controller. Wilson improves the user interface between operator and motor controller during troubleshooting by creating on the PC monitor a sequential flow diagram consisting of boxes, where the flow diagram is a graphical representation of the program to be run by the motor controller. It is then possible to run through the program for the motor controller step by step and to follow the movements on the flow diagram, thereby checking that the sequence is correct. However, Wilson does not deal with the user interface at the initial set up of the motor controller.

The user interface is typically a hand held terminal with a screen display or a personal computer, which is more comfortable because of the larger view. The huge number of parameters which can be set up on the frequency converter - in some cases more than 200 combined with the many options added to the software interface tend to confuse the operator. Not only has he to memorize the parameter numbers or use time to seek information about them, he is also confronted on the screen with an abundance of information and programming choices to be made.

SUMMARY OF THE INVENTION

To aid the operator and to improve the user interface, this invention makes it possible to configure the frequency converter without knowing the parameter numbers, or even without consulting the user manual. The object of the invention is to provide a method of programming a user interface for a motor controller, in particular a frequency converter, wherein the frequency converter is configured by way of parameter numbers, this method comprising the following steps:

a) displaying a first view with a graphic representation of the modes of application, where each mode contains a number of parameters for configuring the motor controller b) selecting one of these modes, c) limiting the possible settings and choices to be chosen by the operator to only contain parameters from the selected mode of operation, and d) incorporating into each view graphics relating to the set of family parameters.

Another object of the invention is the improvement of graphical setting and programming of parameter values by adjusting the curves displayed on the screen to fit the desired values. This fully allows programming without knowing the relevant parameter values, since these automatically and simultaneously are set up dependent on the adjustment of the curve.

A third object of the invention is to provide graphically nearly the same views independent of the selections made before. This is done by using the same input box for the programming of several parameter numbers. Though the prior selections by the operator may result in marked changes in the programming structure and the parameter numbers to be set up, the operator will—in a user friendly way -not perceive this, because the changes on the screen are negligible.

Yet another object of the invention is providing a method of configuring a motor controller following the before mentioned steps and at the end of the set up providing a listing with the alterations programmed, this listing offering the choice of skipping, altering or activating the set up of the frequency converter.

DESCRIPTION OF AN EXAMPLE EMBODYING THE BEST MODE OF THE INVENTION

Figure 1:
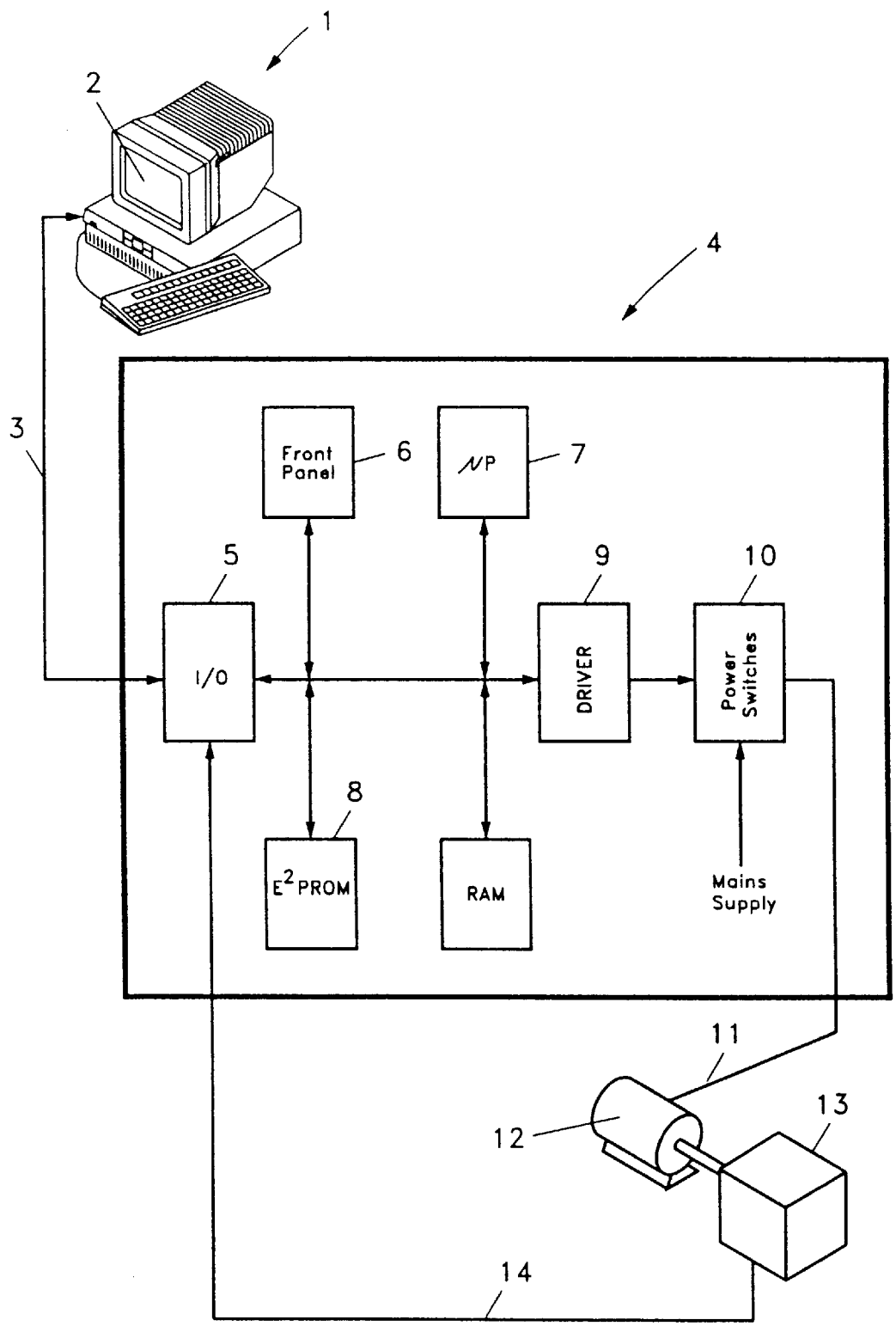
FIG. 1 is a general view of the system motor controller and programming tool.

FIG. 1 shows an overview of the system in which the invention is used. A laptop or stationary computer (PC) 1 has a screen 2, which displays information concerning set up of the motor controller 4, in the following text called a frequency converter. Via a data connection 3, the frequency converter 4 communicates with the PC 1. The frequency converter 4 has an I/O module 5 interfacing to the outside world, and a front panel 6, which is mounted on the unit itself. From this panel, the operator is able to program the unit in nearly the same way as when using the PC loaded with set up software. A microprocessor 7 controls the frequency converter and motor. The set up done by the operator either from the front panel or from the PC is stored in an EEPROM 8. Through a driver 9, the microprocessor controls the activation of the power switches 10, which feed energy in modified form from the mains supply to the electric motor 12 via line 11. The motor is driving a process 13, and the outcome of this process is fed via line 14 back to the frequency converter's I/O-module 5.

Figure 2:
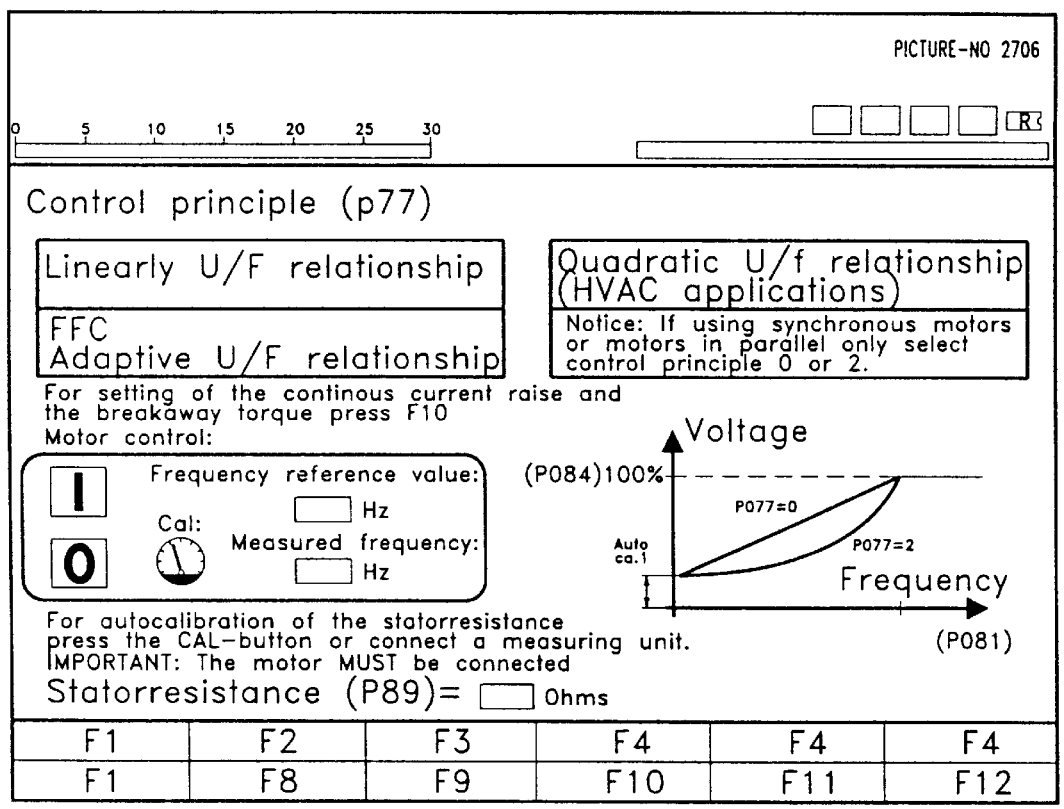
FIG. 2 shows an example of prior art interface between motor controller and programming tool.

Normally, set up of a system like the one shown in FIG. 1 would require a person skilled in this specific frequency converter. An abundance of programmable parameters are at his disposal, which certainly can be overwhelming to the novice. FIG. 2 is an example of a prior art interface, and shows a software [Siemens Simovis] used for commissioning a motor controller. The operator has the choice between three control principles, linearly U/f control, quadratic U/f control and adaptive U/f control. However, independent of the selection made, in the following views he is confronted with a large quantity of information and number of settings to be made. The novice would have difficulties in programming because he is not informed which parameters are necessary to program and which ones can be programmed. Even the skilled user would have to consult the user manual, which is time consuming and he might even miss some settings, which are not necessary but could improve the final control of the motor.

Figure 3:
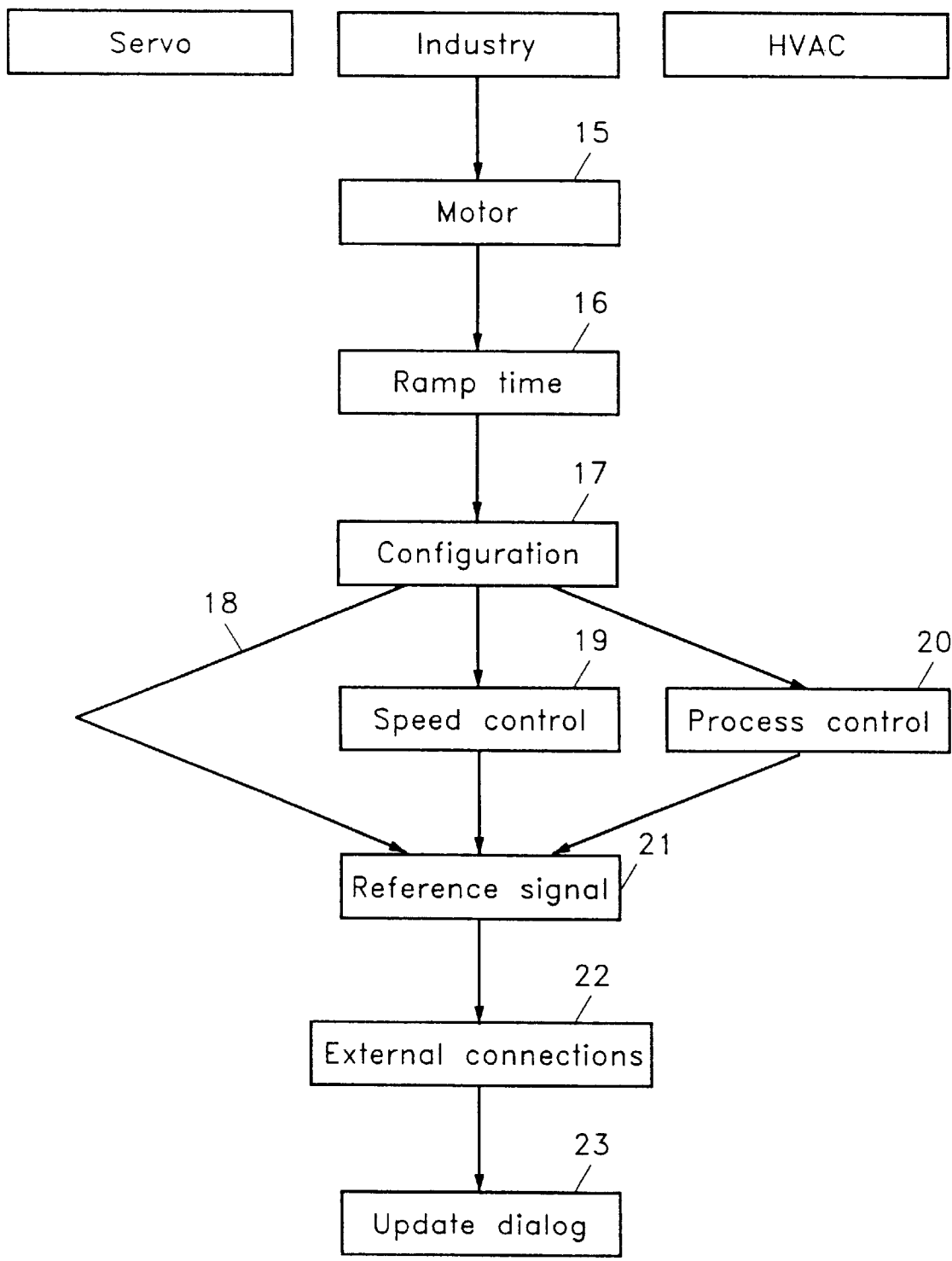
FIG. 3 is a flow chart of the programming process.

FIG. 3 is a flow chart of the programming process. After setting the motor controller to control in "Industry" mode, which means speed regulating for example a conveyor, the frequency converter can be tailored for still more specialized applications. However, providing the motor data 15 and the ramping times 16 is common to all applications. Therefore, boxes 15 and 16 could be interchanged or placed later in the flowchart. The choice of "HVAC" instead of "Industry" would have presented to the operator other parameters and setting possibilities, thus shielding him from the less interesting options in the "Industry" mode. With "Industry" selected, the frequency converter must be configured to the desired application in box 17, which can be "open loop" characterized by line 18, "speed control" 19 or "process control" 20. After finishing these settings, the type of reference signals are set in box 21 and finally the external connections (type of start/stop buttons) are selected in box 22. Box 23 updates the settings and sends them to the frequency converter.

Figure 4:
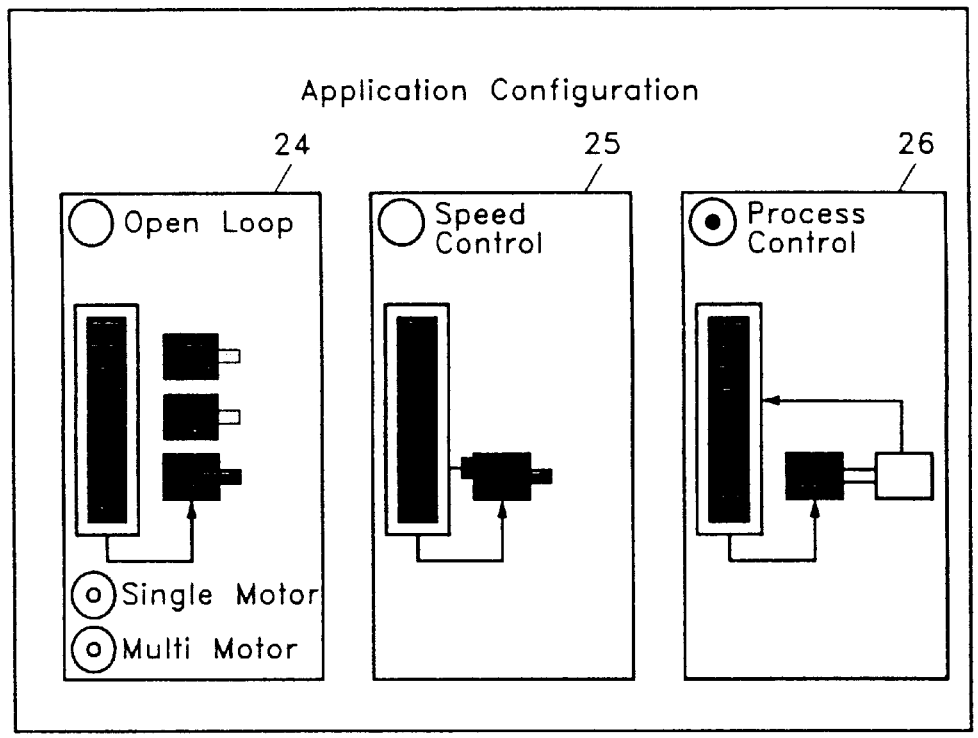
FIG. 4 is a first view showing the possible applications of the motor controller.

According to this invention, instead of presenting all information at one time, a method of programming is provided in which the operator is sequentially guided through the set up, so that only relevant parameters are displayed in the different views. If a first selection is made in a view, the next views only incorporate the parameters belonging to and relevant to the first selection. FIG. 4 is an example of this, and shows a view presented on the PC screen 2 (FIG. 1) to the operator. In this example, which corresponds in sequence to the configuration box 17 of FIG. 3, the frequency converter can execute control in three types of applications: open loop 24 (18 in FIG. 3), speed control 25 (19 in FIG. 3) and process control 26 (20 in FIG. 3). The latter includes PID control, whereas speed control 25 involves speed feedback from an encoder or a tachometer. The simplest mode of control is the open loop. By selecting this one, the operator in the following views will only be presented parameters and choices relevant to this mode of control; he is shielded from more complicated parameters, which only have a function in the other modes. This will allow the novice to make a quick set up. Selecting instead process control 26 means similarly selecting a larger number of parameters to be set, e.g. whether the feed back signal is a voltage, current or pulse signal.

Another feature of the invention is that despite the fact that the number of parameters is larger when speed control 25 (or process control 26) is selected, the operator will not be overwhelmed, because to make the settings the operator does not need to know the programming parameter numbers.

Figure 5:
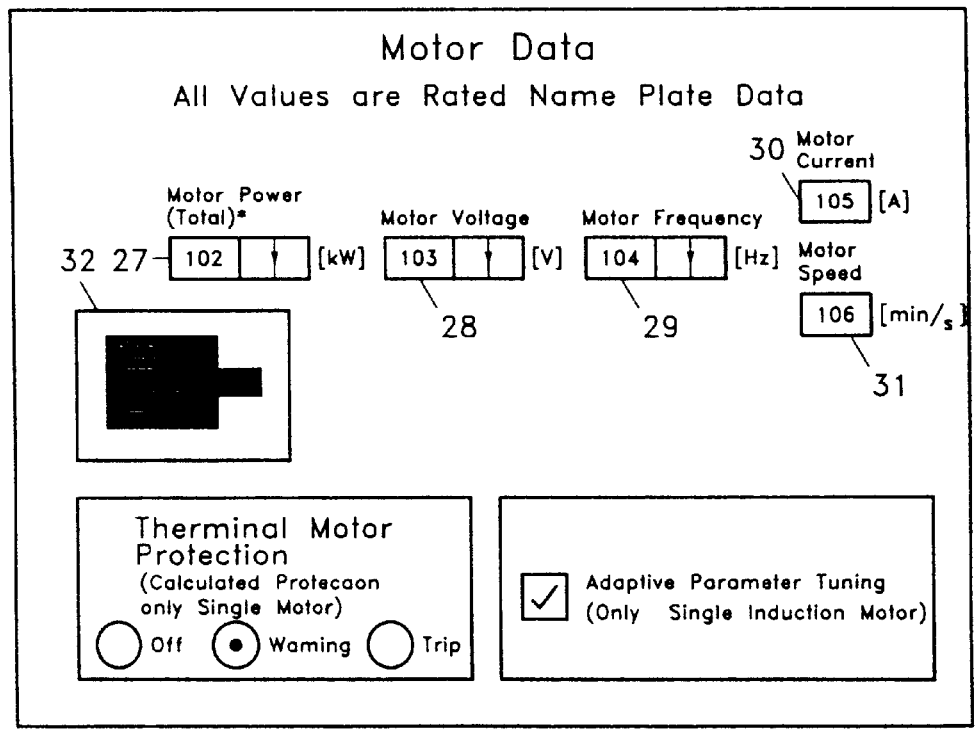
FIG. 5 is a second view showing a family of parameters with a graphic.

Instead, set up of the parameters is accomplished in a more intuitive way by letting the operator enter in the physical values from motor and/or process. This is shown in FIG. 5, which, in this example, is the starting view the operator is led through, corresponding to box 15 of FIG. 3, regardless of whether he wants open loop, speed control or process control application. Entering in the motor data would normally require memorizing from the operator's manual parameter number 102 for motor power, parameter number 103 for motor voltage, parameter 104 for motor frequency, parameter 105 for motor current and parameter 106 for nominal motor speed and then sequentially accessing these parameters to set them up. According to the invention, instead of presenting the parameter numbers to the operator, which numbers actually only are of internal interest to the manufacturers of the frequency converter, the operator is presented the physical characteristics to be set in the input boxes 27, 28, 29, 30 and 31 (to ease the description, the parameter numbers are written in the boxes). This means entering respectively e.g. 5 kW, 38 OV, 60 Hz, 13 A and 1500 RPM without caring about or memorizing parameter numbers. This is a more intuitive way of programming the frequency converter, user friendly and time saving. The program which controls the user interface then allocates the settings to the right parameter numbers.

This can be done in the following way. The program allocates an address in the random access memory (RAM) of the PC to each box in the view. When entering a value in a box, the value is written in the corresponding RAM address. To the program, this RAM address is known to contain the setting value of a certain parameter in the frequency converter. When all the relevant parameters in the different views on the PC screen have been set to the desired values, a full look up table with parameter settings has been generated in the RAM of the PC. Upon final programming of the frequency converter (23 in FIG. 3), the PC sends the look up table and the corresponding parameter numbers via a serial data link (in FIG. 1) to the EEPROM (8 in FIG. 1) of the frequency converter.

Figure 6:
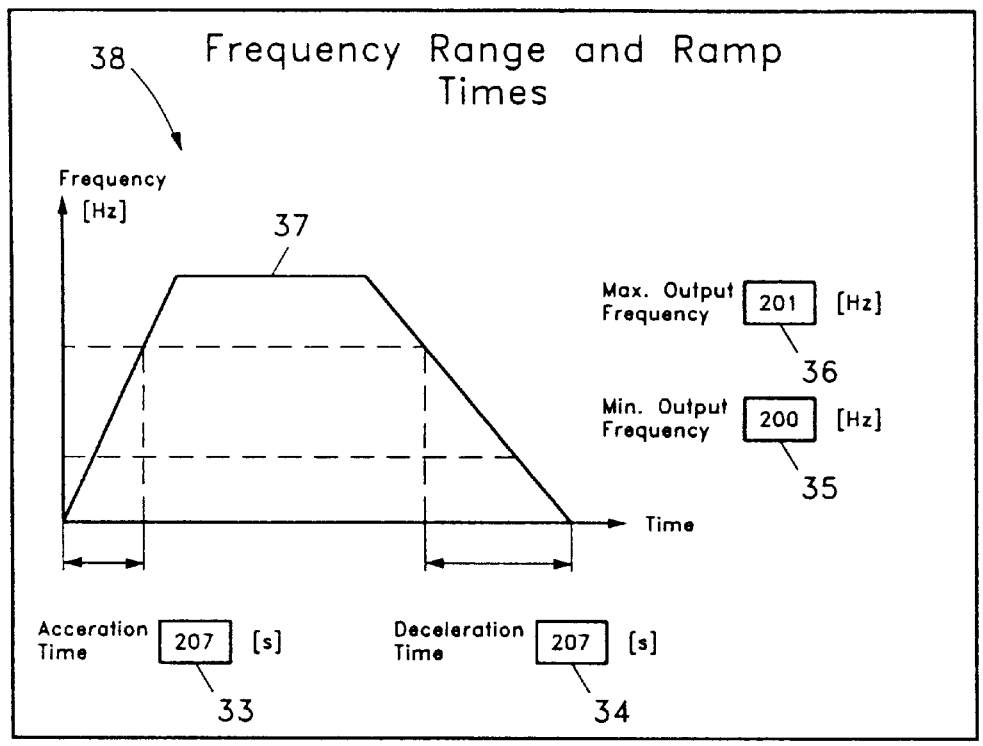
FIG. 6 is a third view showing a time/frequency curve and a set of family parameters.

Yet another aspect of the invention becomes clear, again referring to FIG. 5. Instead of incorporating in one view all the physical characteristics to be given, only a set of family parameters are given for each view. E.g. parameter numbers 102–106 in the input boxes 27–31 are one set of family parameters, since they all deal with the motor data. A graphic 32 on FIG. 5 representing a motor symbolizes the contents of this family of parameters. Correspondingly, parameter numbers 200, 201, 207 and 208 in FIG. 6 make up another family of parameters, because they all deal with ramping times and motor speed. Here the operator inputs the physical characteristics of acceleration/deceleration time and max/min output frequency of the frequency converter in the boxes 33, 34, 35 and 36. Again, after entering the physical values, the different parameter numbers in the family are set automatically.

Another method according to the invention of entering these values consists of linking the graphic with the input boxes. By pointing on the curve 37 with the computer screen pointer and identifying the acceleration points desired, e.g. by clicking a computer mouse, the values in the boxes 33–36 will change correspondingly. This is an easy and intuitive way of programming.

Figure 7:
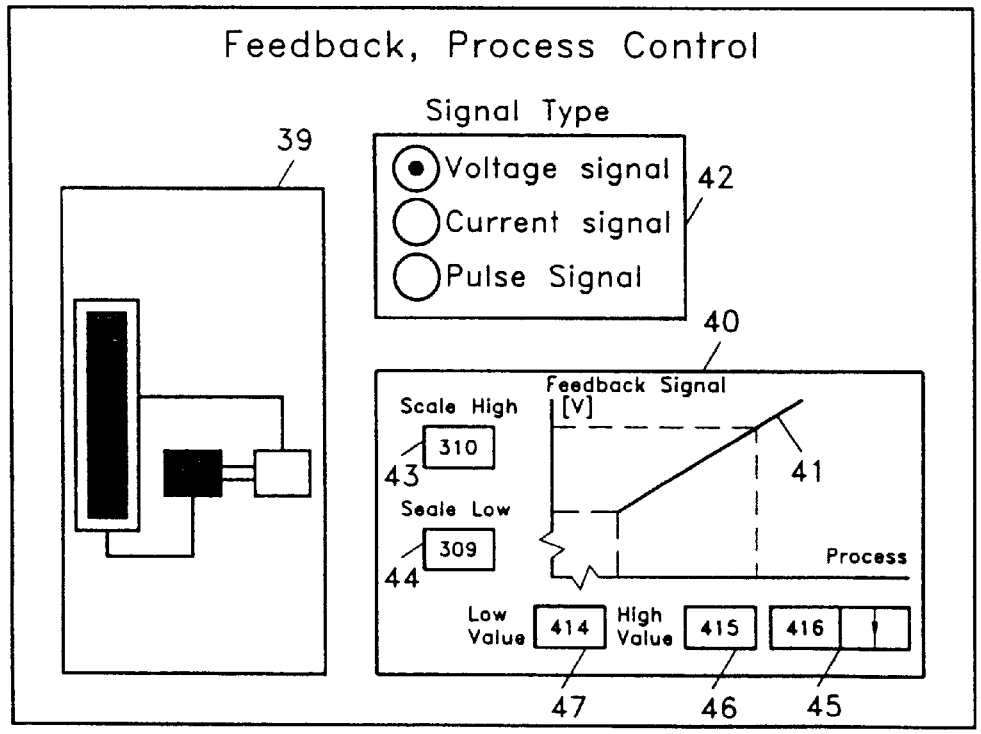
FIGS. 7, 8 and 9 show the views appearing depending on the chosen feedback signal.

The operator has now been led through a view incorporating one set of family parameters concerning motor data (FIG. 5), another view with another set of family parameters concerning acceleration and deceleration (FIG. 6), and finally he has chosen the process control application (FIG. 4). In the next view, he has to decide on the type of feedback signal from the process. FIG. 7 shows graphics 39 and 40 relating to a set of family parameters, including a curve 41 displaying the relationship between process output and feedback signal. In the box 42 the operator can choose between three types of feedback signals, i.e. voltage signal, current signal and pulse signal. This corresponds to the step of the reference signal box 21 of FIG. 3.

Figure 8:
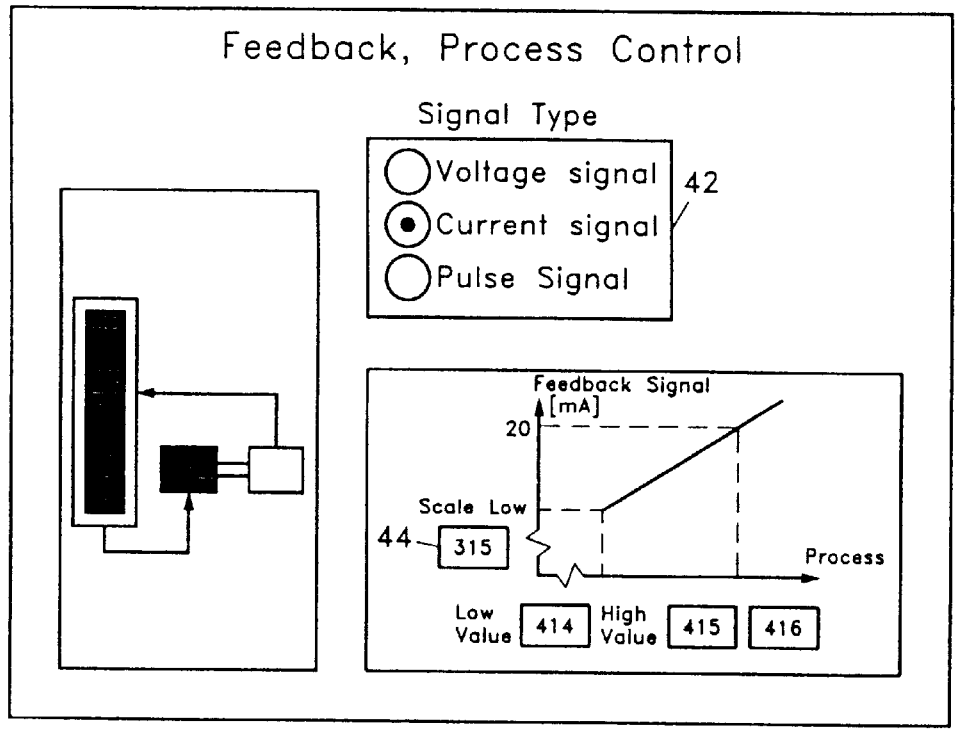
Figure 9:
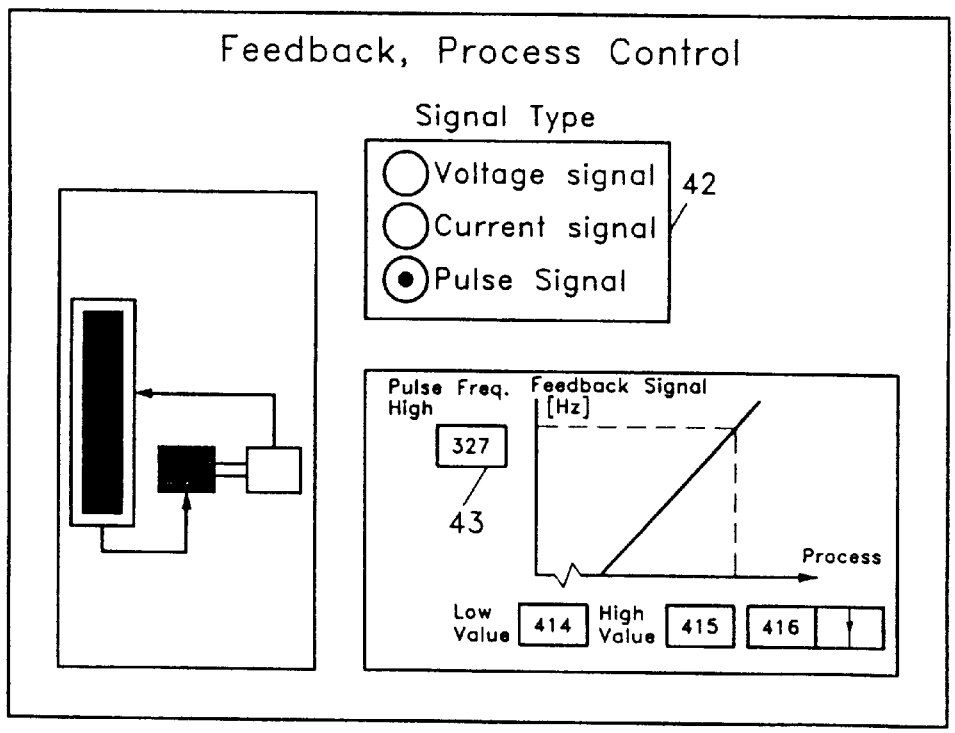

The following explanation will describe yet another aspect of the invention, consisting of the same input box being used for the programming of several parameter numbers. By using this method, a high level mode of programming the frequency converter is achieved, because the user interface omits the less interesting control of the frequency converter and allows the operator to get close to process control in terms he uses. If selecting voltage signal in box 42, the operator has to input five figures, which are maximum feedback voltage 43 ("Scale high"), minimum feedback voltage 44 ("Scale low"), process unit 45 (e.g. kg, s, pcs, %) and max and min number of outputs from the process, 46 and 47. Again, entering data is done by the operator without knowing any parameter numbers. This would also be the case, if current signal in box 42 were activated instead of voltage signal. FIG. 8 shows this situation, where the only difference to the operator is the change of y-axis labelling to [mA] and the upper limit fixed to 20. Internally in the program, however, things have changed. Where the box 44 "Scale low" in FIG. 7 was tantamount to programming parameter number 309, it is now parameter number 315. However, the operator will not perceive and is not required to physically enter this change. In FIG. 9 pulse signal in box 42 has been selected and again, the y-axis has changed. In the box 43, where formerly parameter number 310 was programmed, is now parameter number 327 set. This change of parameter numbers in the boxes in dependence on the choices made in box 42 is easily made. Instead of letting box 43 in FIG. 7 point to the address in the RAM where the setting value for parameter number 310 is to be stored, the box 43 in FIG. 9 points to the RAM address of the parameter number 327.

Various changes can be made to the invention without departing from the spirit thereof or scope of the following claims.

What is claimed is:

1. A method of programming a user interface for a motor controller via a computer incorporating a monitor displaying different screen displays, wherein the motor controller is configured by way of parameters and where an operator is guided in views sequentially through the programming procedure, the method comprising the steps of:

a) displaying a first view with a graphic representation of modes of application, where each mode contains a number of parameters for configuring the motor controller, these modes of application indicating basic control principles to be chosen, b) selecting one of these modes of application, c) in the guided views limiting the number of settings and choices to be chosen by the operator to only contain parameters from the selected mode of application, d) whereby each view consists a set of functionally related parameters in the form of a set of family parameters, and e) incorporating into each view graphics relating to the set of family parameters.

2. Method of programming a user interface for a motor controller according to claim 1, wherein the configuration is done by an operator by means of a keyboard or mouse and a graphic, where the graphic is linked with input boxes in the views, the method comprising sensing selections on a data representation in the graphic to select setting values for programming the motor controller, and simultaneously changing the values in the input boxes so that the selections in the graphic correspond to the values in the input boxes.

3. Method of programming a user interface for a motor controller according to claim 1 wherein the same input boxes are employed in different screen displays for the programming of different parameters in the motor controller.

\* \* \* \* \*